Feb. 19, 1924.
J. F. RULE
1,484,085
PRODUCING FORMED CHARGES OF MOLTEN GLASS
Filed Dec. 13, 1920     5 Sheets-Sheet 4
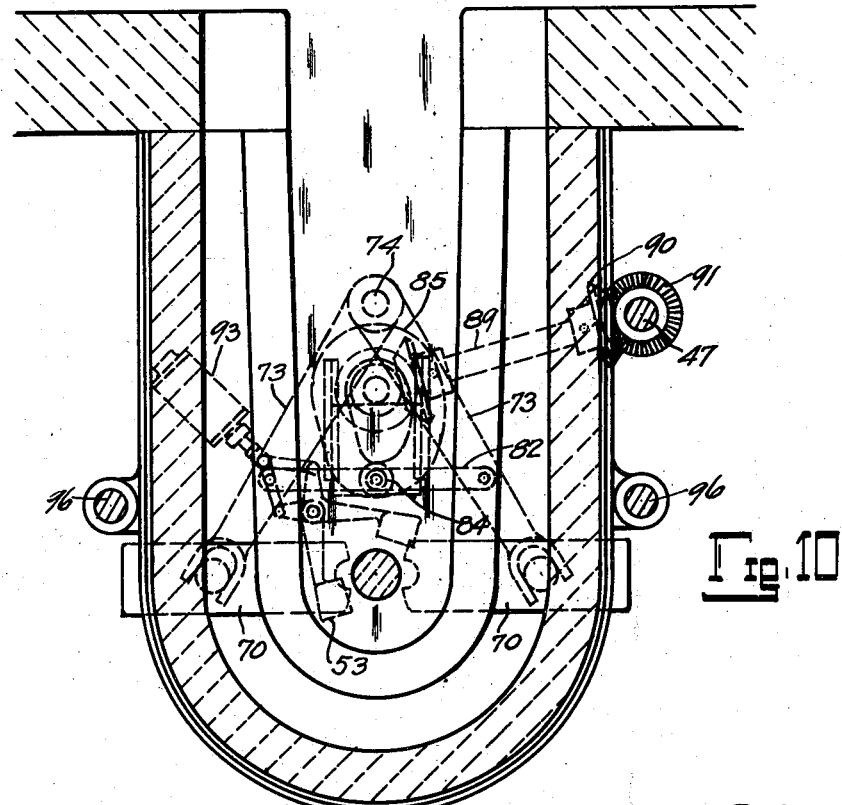
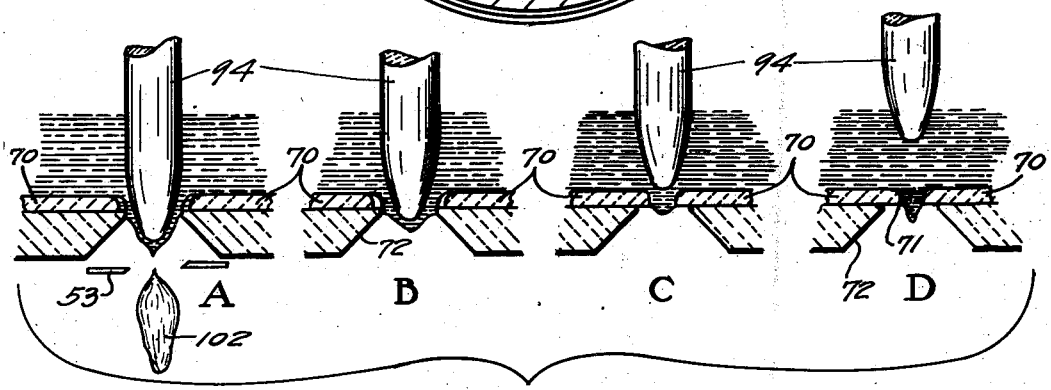
INVENTOR
J. F. Rule.

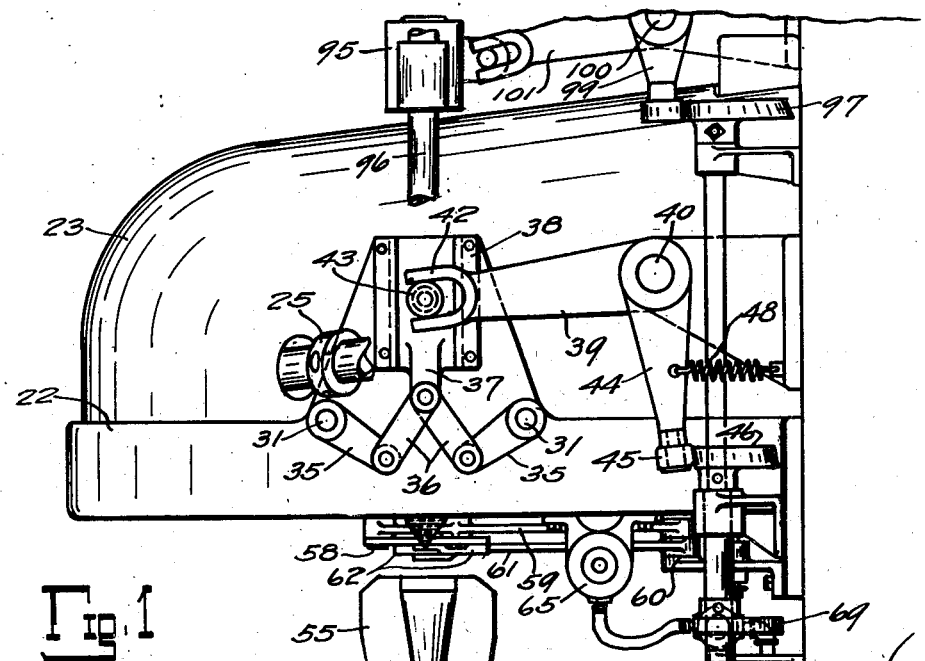
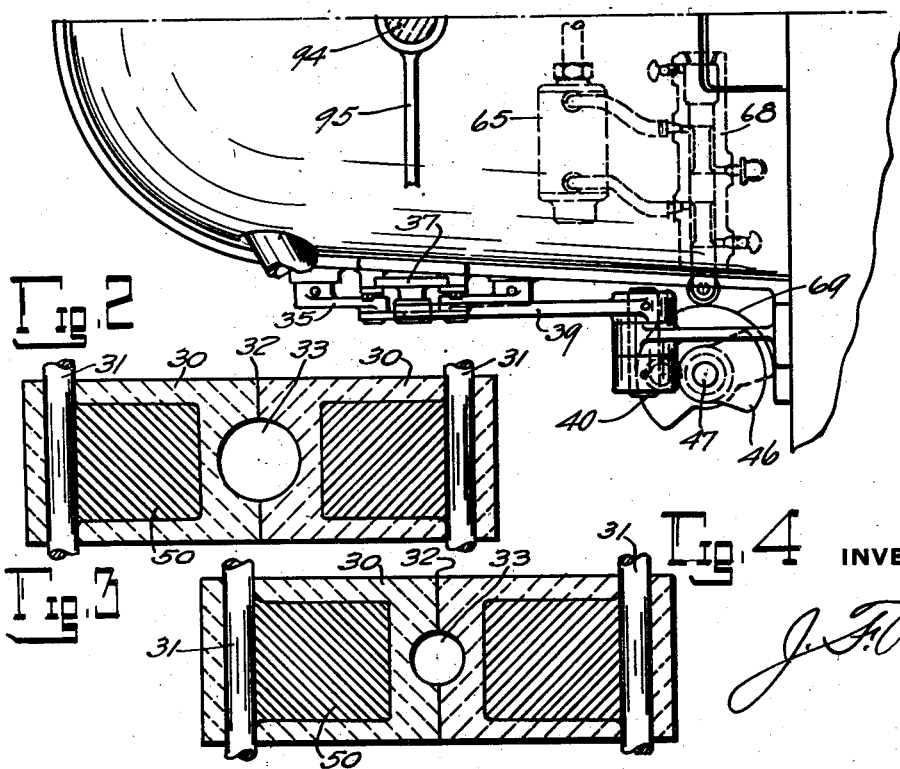

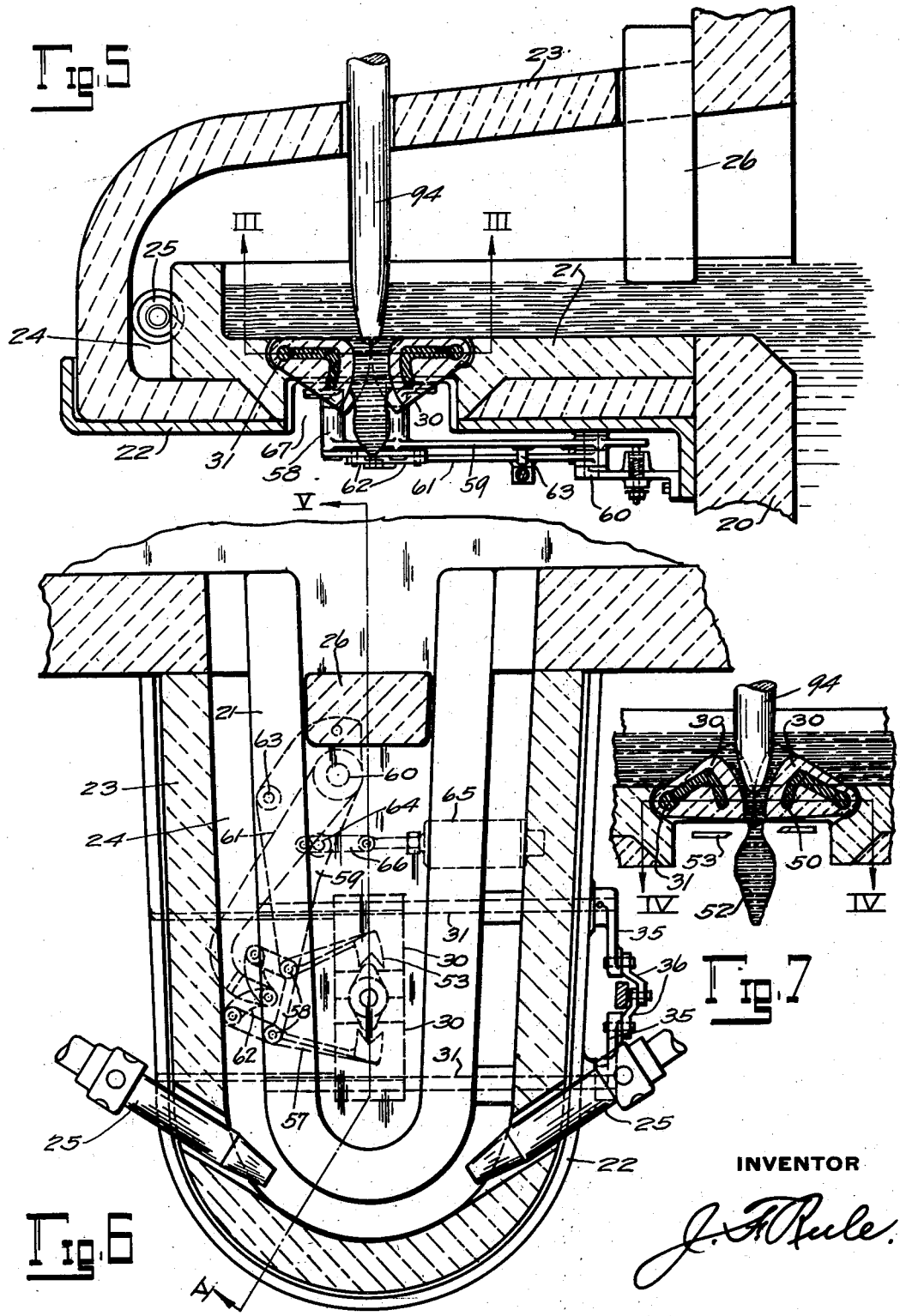

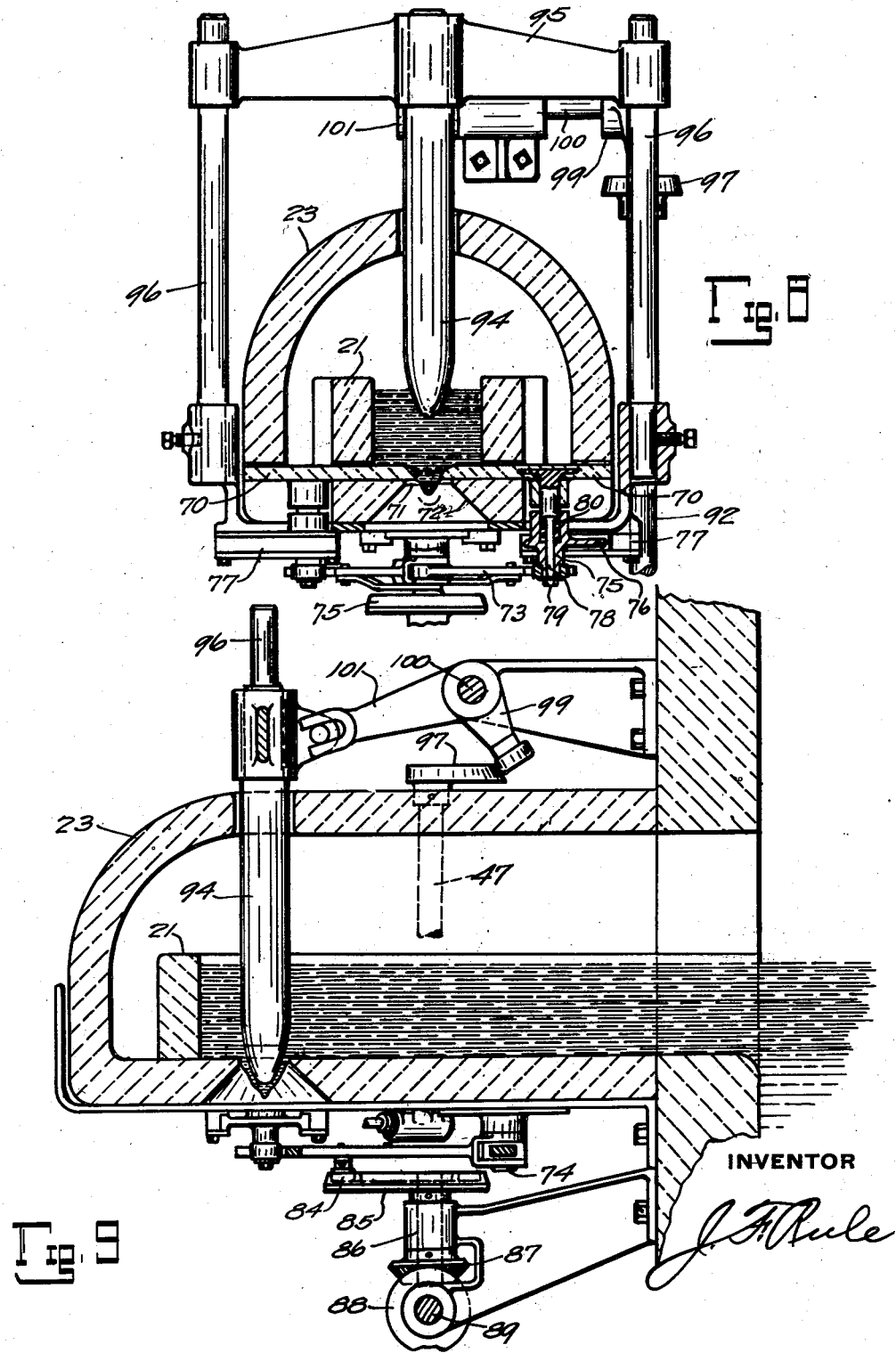

Feb. 19, 1924.
J. F. RULE
1,484,085
PRODUCING FORMED CHARGES OF MOLTEN GLASS
Filed Dec. 13, 1920   5 Sheets-Sheet 5
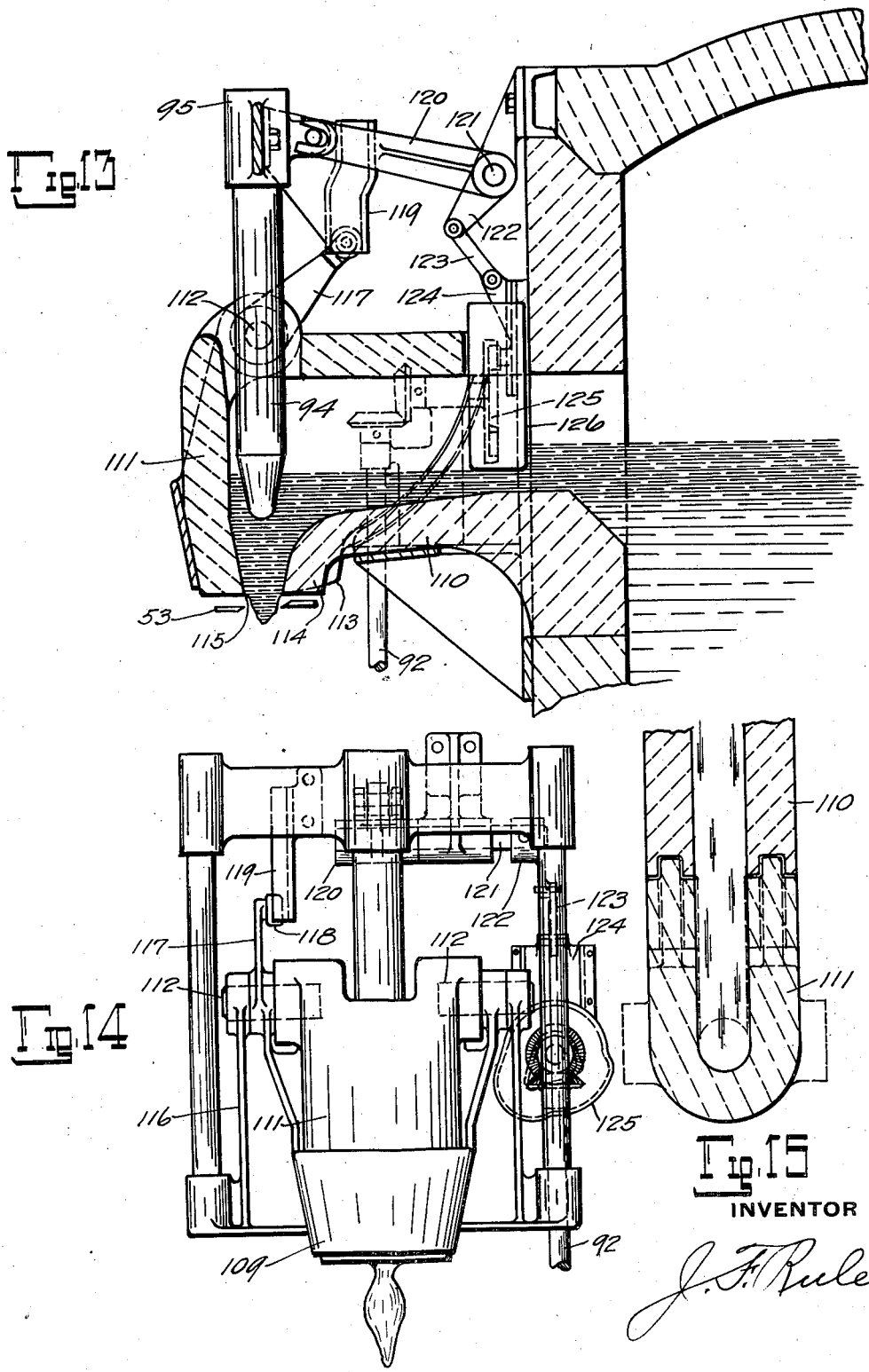
INVENTOR
J. F. Rule Patented Feb. 19, 1924.

1,484,085

UNITED STATES PATENT OFFICE.

JOHN F. RULE, OF TOLEDO, OHIO, ASSIGNOR TO THE OWENS BOTTLE COMPANY, OF TOLEDO, OHIO, A CORPORATION OF OHIO.

PRODUCING FORMED CHARGES OF MOLTEN GLASS.

Application filed December 13, 1920. Serial No. 430,129.

*To all whom it may concern:*

Be it known that I, JOHN F. RULE, a citizen of the United States, residing at Toledo, in the county of Lucas and State of Ohio, have invented new and useful Improvements in Producing Formed Charges of Molten Glass, of which the following is a specification.

My invention relates to a method and means for producing formed charges of molten or plastic glass adapted for charging the molds of glass forming machines. In the present state of the art it is customary to produce charges or gobs of glass by permitting the molten glass to issue through an outlet orifice in the bottom of a container, the glass being periodically severed at a point below the outlet to produce individual masses or charges. The rate at which the glass issues and the form and size of the issuing mass are sometimes regulated and controlled in a measure by some regulating device acting on the glass within the container, such as a plug reciprocating vertically in the glass above the outlet.

An object of the present invention is to provide an improved method and means for regulating the flow of glass through the outlet orifice, for controlling the size and shape of the charge or gob, and for controlling the time interval between the deliveries of successive charges. To this end the invention provides means for periodically varying the size of the outlet. The expansion and contraction of the orifice may be effected in various ways, as hereinafter pointed out.

Other features of the invention will appear hereinafter.

In the accompanying drawings:

Figure 1 is a sectional elevation of apparatus constructed in accordance with the present invention.

Figure 2 is a plan view of the same.

Figure 3 is a section at the line III—III on Figure 5, showing the regulator with its outlet orifice.

Figure 4 is a section at the line IV—IV on Figure 7, showing the parts in a different position, whereby the size of the orifice is reduced.

Figure 5 is a sectional elevation of the apparatus, the section being taken at the line V—V on Figure 6.

Figure 6 is a sectional plan of the same.

Figure 7 is a sectional elevation through the regulator.

Figure 8 is a front sectional elevation of a modified construction.

Figure 9 is a sectional side elevation of the same.

Figure 10 is a sectional plan of the same.

Figure 11 is a diagrammatic view illustrating successive steps in the formation of a gob.

Figure 12 is a detail showing connections between a slide block and its operating cam.

Figures 13 to 15 illustrate a further modification, Figure 13 being a sectional side elevation, Figure 14 a front elevation, and Figure 15 a sectional plan of the same.

Referring particularly to Figures 1 to 7 inclusive, the molten glass flows from the main tank or furnace 20 into a boot or extension 21 supported on a metal casting or frame-work 22, the latter also forming a support for an enclosing wall or hood 23. The hood 23 is of a size to provide a channel or air space 24 surrounding the side and front end walls of the extension 21. Burners 25 may be provided for supplying heat to the channel 24 and the space over the glass in the boot, the flames and hot gases of combustion being carried rearwardly into the main furnace. In this manner, cooling of the glass in the boot may be prevented, or the temperature raised, if desired. A vertically adjustable valve gate 26 may be used to regulate the flow of glass into the boot, and may also be lowered to shut off the boot from the main furnace when it is desired to empty the boot for repairs or other purpose.

The glass is discharged through an opening in the bottom of the boot, the flow of glass being regulated and controlled by a regulating device comprising blocks 30 of refractory material. These blocks, as shown, are segmental in form and are mounted on rock shafts 31 journalled in or extending through the side walls of the boot. The rock shafts may be made hollow and kept cool by the circulation of air or water, if desired. The inner faces 32 of these regulator blocks meet and have a rolling contact as the blocks are rocked. A groove or depression, semi-circular in cross section, is formed in each of the meeting faces 32, the two grooves together forming a circular opening or passageway 33 through which the glass flows. These grooves are tapered so that when the blocks are swung down to the Figure 5 position, the opening or passageway 33 is of comparatively large diameter, and when the blocks are rocked upward to the Figure 7 position, the diameter of the opening is comparatively small, as also shown in Figure 4. The means for rocking the regulator blocks is as follows:

Rock arms 35 fixed to the rock shafts 31 externally of the frame 22 are connected through links 36 to a block 37 slidable vertically in a stationary guide 38. An arm 39 on a rock shaft 40 is connected by means of a yoke 42 and roll 43 to the slide block 37. A second rock arm 44 on the shaft 40 carries a cam roll 45 running on a cam 46 in a vertical drive shaft 47. A spring 48 holds the cam roll against its cam. The shaft 47 is rotated continuously and transmits motion through the parts just described and thereby rocks the regulator blocks up and down. Said blocks, which are made of fire clay or other refractory material, are preferably reenforced by metal cores 50.

When the regulator is in the Figure 5 position, the outlet opening or channel 33 is comparatively large, permitting the passage of the glass in the form of a comparatively large mass or gob. When the amount of glass suspended from the regulator, as shown in Figure 5, is sufficient, being approximately that required to form a complete gob, the regulator blocks are swung upward to the Figure 7 position. This movement serves to contract the opening 33, thereby restricting the glass and forming a neck 51 (Fig. 7) on the gob 52, and at the same time an upward pull is exerted on the glass, owing to its adherence to the walls of the channel. Cutter blades 53 are now operated (by mechanism hereinafter described) and sever the gob which is thereby permitted to drop and enter or be conveyed to a mold on a glass forming machine. After the shears operate, the further flow of glass is comparatively slow, owing to the small diameter of the channel and the small amount of glass protruding below the outlet so that the formation of the succeeding gob can be retarded as long as necessary, or until another mold is in position to receive its charge. The glass which flows or protrudes through the restricted opening forms a narrow, pointed or tapered end for the issuing gob. When the regulator blocks again swing downward they not only enlarge the passageway but exert a downward pull or force on the glass which adheres to the walls of the channel, thereby facilitating a rapid movement of the glass. At the same time the spread or outward movement of the lower ends of the channel walls assist in spreading out and increasing the diameter of the body of glass. In this manner the gob is given a tapered form adapting it for entering and conforming to the shape of the molds. This form of gob is especially adapted for an inverted narrow necked bottle mold, such as the mold 55 (Figure 1), as the tapered end of the gob can readily enter and conform to the shape of the neck mold 56.

An auxiliary regulator in the form of a vertical plug 94 may be used, if desired, in co-operation with the regulator blocks 30 to further control and shape the glass. This plug if held stationary assists in expelling the gob of glass as the blocks 30 swing upward, because it acts as an obstruction to the glass being carried up with said blocks. It also restricts the outlet while the blocks are in their upper position. If desired, the plug 94 may be reciprocated vertically in synchronism with the movements of the regulator blocks 30 (by mechanism hereinafter described) to further control the flow and formation of the gobs. By a quick downward movement of the plug while the regulator blocks are in the Figure 5 position, a rapid and forceful expelling action is exerted on the glass. The plug may be moved upward after the gob is severed and while the blocks 30 are in the Figure 7 position, thereby applying an upward pull to the glass which may be sufficient to draw the stub of glass upward above the orifice and cause the portion which has been chilled by the cutter, to be incorporated in the body of the succeeding gob.

The cutting mechanism may be of any approved form, but as herein shown (Fig. 6) comprises blades 53 carried at the outer ends of arms 57 pivoted at 58 to an arm or frame 59 mounted to swing about a pivot 60. A rock arm 61 also swinging on the pivot 60, is connected at its outer end to toggle links 62, the latter pivoted to the levers 57. The arm 61 has a limited swinging movement relative to the frame 59, determined by stops 63 and 64 on the frame. A piston motor 65 is connected through a link 66 to the arm 61 for actuating the cutter mechanism. The operation of this mechanism is as follows:

Assuming the parts to be in the position shown in Figure 6, the motor operates to swing the arm 61 to the left, thereby first straightening the toggle links and swinging the cutter blades to cutting position. The continued movement of the arm 61, by carrying the toggle links beyond the straight line position, immediately separates the cutter blades. The arm 61 by this time is brought against the stop 63 and during the final movement of said arm, swings the frame 59 to the left, thereby carrying the cutter bodily away from the discharge orifice. When the motor 65 operates in the reverse direction, the arm 61 swings inward until it engages the stop 64, thus restoring the shear arms 57 and toggle 62 to the relative position shown in Figure 6. The continued movement of the arm 61 then swings the frame 59 to the right, bringing the entire mechanism to the Figure 6 position. It will be seen, by reference to Figure 5, that the floor of the boot is recessed or formed with a channel 67 to receive the cutter; the cutter blades being offset in an upward direction to bring them in close proximity to the discharge orifice when the cutting takes place. The shears are bodily withdrawn in the manner above noted to permit the downward movement of the regulator blocks to a position below the cutting plane. The motor 65 may be operated by compressed air supplied thereto through a slide valve 68 (Fig. 2) of usual construction, said valve being actuated by a cam 69 on the drive shaft 47.

Figures 8 to 12 inclusive illustrate a modification in which the size of the outlet orifice is periodically varied by a pair of regulating blocks 70 mounted to slide horizontally on the floor of the boot 21 and thereby partially close the orifice 71 formed in the floor of the boot. The walls 72 are flared downwardly and outwardly from the orifice 71, so as to maintain the point of suspension of the glass at or adjacent the upper surface of the said floor. The regulator slides 70 are reciprocated horizontally toward and from each other by means of a pair of arms 73 connected at their outer ends to said slides and mounted at their inner ends on a common pivot 74. The arms 73 are located a substantial distance below the floor of the boot and the connection between each of said arms and its slide comprises a sectional post 75. The lower section of this post is formed with a slide block 76 mounted in a stationary guideway 77. The upper section of the post 75 is provided with a stem 78 and an adjusting nut 79 on the lower end of said stem, permitting adjustment to compensate for expansion when the parts are heated up. A spring 80 interposed between the post sections holds them in adjusted position and exerts a certain upward pressure on the slide 70, thereby compensating for the weight of said slide and the glass thereon. A pair of links 82 are connected at their outer ends to the arms 73 and at their inner ends to a cam roll 84 running in the cam groove of a cam 85. This cam is carried on a vertical shaft 86 to which is keyed a bevel gear 87 running in mesh with a gear 88 on a horizontal shaft 89 which carries a bevel gear 90 running in mesh with a gear 91 on a continuously rotating vertical drive shaft 92.

The cutter blades 53, as shown in Figure 10, are actuated by a piston motor 93. The rotation of the cam 85 moves the cam roll 84 toward and from the discharge orifice, thereby operating through the links 82 and arms 73 to move the regulator slides 70 toward and from each other. When the slides 70 are in their outermost position the outlet 71 is unrestricted. As the slides move inward, the outlet opening is gradually reduced. The shape of this reduced opening will, of course, depend on the shape given to the inner ends of the slides, but is preferably substantially circular as indicated in the drawings.

In combination with the slides 70 the auxiliary regulator 94 may be used if desired in a manner similar to that above explained in connection with the regulator blocks 30. This regulator plug 94 is carried by a yoke 95 mounted to reciprocate vertically on stationary guide posts 96. The plug is reciprocated by means of a cam 97 on the drive shaft, said cam operating through an arm 99 on a horizontal rock shaft 100 carrying a rock arm 101 connected to the yoke. It will be noted that the movements of the regulator plug 94 are in synchronism with the movements of the slides 70, the latter being given a horizontal reciprocation for each vertical reciprocation of the plug.

Figure 11 illustrates the positions of the regulating devices at a number of successive periods during a cycle of operations. At A the position of parts is shown immediately after a gob 102 has been severed. At this time the slides 70 are fully separated and the plug 94 is in its lowermost position in which it protrudes through the outlet orifice. At B the plug is moving upward and carrying with it the stub of glass which adheres to the plug after the gob has been severed. At C the plug is still moving upward, has reached a position above the slides 70, and the latter have moved inward to restrict the opening so that the flow of glass is temporarily retarded. At D the plug is in its uppermost position and the glass is slowly moving downward through the restricted opening, thereby forming the lower pointed end of a gob suitable for entering the narrow neck mold. The slides now withdraw, leaving the orifice wide open, and the plug is at the same time, or shortly after, moved downward, thereby quickly expelling a gob of glass of the required size, which is then severed, completing the cycle of operations. It will be observed that the slides 70 very effectively retard the flow, so that the discharge of glass is under complete control. Also, when the regulating slides are withdrawn, a gob of the required size and shape is quickly expelled and severed, so that the glass is only exposed to the chilling effect of the outside air for a very short time before entering the mold. An important feature of the invention consists in the formation of a suitably pointed or tapered end of the gob in the manner above explained. It will be understood that the size and shape of the gobs may be widely varied to meet varying conditions and requirements by adjusting the speed and extent of movement of the slides and of the plug and the timing of the plug movements relative to those of the slides.

Figures 13, 14 and 15 illustrate a further modification in which the boot or receptacle comprises a stationary section 110 and a movable section 111 having trunnions 112 by which it is mounted to rock about a horizontal axis. The side walls 113 of the movable section straddle the floor or extension 114. The swinging movement of the section 111, therefore, increases and decreases the diameter of the outlet 115. The trunnions 112 are journaled in standards 116. A rock arm 117 extending from one of the trunnions, has a cam roll 118 to run on a cam 119. The arm 117 may be an extension of a metal supporting frame 109 for the section 111. The cam 119 is carried on the yoke 95 which carries the plug 94. Said yoke is reciprocated by a rock arm 120 on a rock shaft 121 carrying an arm 122 connected through a link 123 with a vertical slide 124 carrying a cam roll running on a cam 125, said cam being driven from the drive shaft 92 through suitable gearing. It will be seen that as the plug 94 moves downward and reaches a certain position, the cam 119 will operate through the arm 117 to swing the section 111 outward, thereby enlarging the outlet 115 and assisting in shaping the gob and quickly expelling it. The rate of flow of glass from the furnace into the boot may be regulated by a gate valve 126 adjustable up and down, whereby the amount of glass discharged during each cycle of operations is regulated and controlled.

Modifications other than those herein shown may be resorted to within the spirit and scope of my invention.

What I claim is:

1. The combination of a container for molten glass provided with an outlet, and automatic means for periodically expanding and contracting said outlet and thereby regulating the discharge of glass therethrough.

2. The combination of a receptacle in which a continuous supply of molten glass is maintained, said receptacle having an outlet orifice in the bottom thereof through which the glass issues, and automatic means for periodically enlarging and diminishing said orifice.

3. The combination of a receptacle in which a continuous supply of molten glass is maintained, said receptacle having an outlet orifice in the bottom thereof through which the glass issues, and means for periodically moving the side walls of the orifice toward and from each other and thereby periodically varying the size of the orifice.

4. The combination of a container for molten glass having a discharge orifice, and means for periodically varying the flow of glass therethrough by varying the size of the discharge orifice by a movement of the walls of said orifice.

5. The combination of a container for molten glass having a discharge opening through which the glass issues and from the walls of which the glass is suspended, means to periodically sever the issuing glass below the point of suspension, and means for regulating the movement of glass through said orifice by a periodic expanding and contracting movement of said walls at the point of suspension.

6. The combination of a container for molten glass having a discharge opening through which the glass issues and from the walls of which the glass is suspended, means to periodically sever the issuing glass below the point of suspension, and automatic means to periodically expand and contract said opening in synchronism with the severing operation.

7. The combination of a container for molten glass, means providing a vertically disposed passageway or channel through which the glass issues, and means to regulate the movement of the glass through said channel by a combined up and down movement and expansion and contraction of said channel.

8. The combination of a container for molten glass having an outlet orifice in the bottom thereof through which the glass issues, means to periodically contract said orifice and thereby restrict the diameter of the issuing glass adjacent said orifice, and means to sever the glass at said restricted point.

9. The combination of a container for molten glass, a regulator comprising spaced walls between which the glass issues from the container, and means to periodically impart a combined downward and divergent movement of said walls, by which the passageway is periodically enlarged.

10. The combination of a container for molten glass, a regulating device comprising a pair of rocking elements having their faces in rolling contact, said faces having channels formed therein which together form a passageway through which the glass issues, and means to rock said elements.

11. The combination of a container for molten glass, a regulating device comprising a pair of rocking elements having their faces in rolling contact, said faces having channels formed therein which together form a passageway through which the glass issues, and means to rock said elements and thereby impart an up and down movement to said contacting faces, the channel walls being upwardly flared so that the downward movement of said elements increases the diameter of the passageway.

12. The combination of a receptacle to contain molten glass, means for causing a regulated flow of glass from the receptacle comprising a pair of segments mounted to rock about horizontal axes and having abutting faces in rolling contact, said faces provided with vertically disposed recesses which together form a channel through which the glass issues, automatic means for periodically rocking said segments up and down, and means to periodically sever the glass beneath said segments.

13. The combination of a receptacle to contain molten glass, means for causing a regulated flow of glass from the receptacle comprising a pair of segments mounted to rock about horizontal axes and having abutting faces in rolling contact, said faces provided with vertically disposed recesses which together form a channel through which the glass issues, automatic means for periodically rocking said segments up and down, and means to periodically sever the glass beneath said segments, said recesses being upwardly and outwardly flared whereby the diameter of the channel is increased by the downward movement of the segments and decreased by their upward movement.

14. The method which consists in causing molten glass to issue through an orifice, periodically expanding and contracting said orifice, and severing the issuing glass at a point beyond said orifice.

15. The method which consists in causing molten glass to issue from a container through an orifice and be held in suspension from the orifice, periodically contracting the walls of said orifice and thereby reducing the diameter of the suspended mass of glass adjacent the orifice, and severing the glass at said reduced point.

16. The method of forming gobs of molten or plastic glass which consists in causing the glass to issue through an orifice, suspending the issuing glass from the walls of said orifice, periodically contracting said orifice by an inward movement of the walls thereof, whereby the diameter of the suspended mass is reduced adjacent the point of suspension, and severing the glass at said reduced diameter.

17. The method of forming gobs of molten or plastic glass which consists in extruding the glass through an orifice and suspending the gob therefrom during its formation, increasing the size of the orifice and simultaneously exerting a downward force on the issuing glass by a combined downward and divergent movement of the walls of the orifice, reversing said movement of said walls and thereby restricting the orifice and applying an upward force to the issuing glass, and severing the suspended gob adjacent said orifice.

18. The combination of a container for molten glass having an outlet orifice in the bottom thereof, means to periodically expand and contract said orifice, and regulating means cooperating therewith to periodically impart an expelling force on the glass within the container in synchronism with the expansion and contraction of said orifice.

19. The combination of a container for molten glass, means providing an outlet orifice in the bottom thereof through which the glass issues, a regulating plug extending downward into the glass above said orifice, means to reciprocate said plug vertically, and means to expand and contract said orifice in synchronism with the movements of the plug.

20. The method of producing formed masses of plastic glass, which consists in causing the initial portion of the mass to be extruded through an outlet orifice, gradually enlarging the orifice as the outward movement of the glass continues, whereby the lower portion of the mass is tapered, and severing the mass while suspended from the orifice.

21. The method of producing formed masses of plastic glass, which consists in causing the initial portion of the mass to be extruded through an outlet orifice, gradually enlarging the orifice as the outward movement of the glass continues, whereby the lower portion of the mass is tapered, reducing the diameter of the orifice, and severing the suspended mass.

22. The method which consists is causing a gravity flow of glass through an orifice, periodically enlarging the diameter of the orifice during said flow, periodically applying an expelling force to the glass above the orifice, and periodically severing the glass at a point beneath the orifice.

23. In gob forming apparatus, the combination of a container for molten glass having an outlet orifice in the bottom thereof, means to periodically enlarge the diameter of said orifice, means to periodically exert an expelling force on the glass above said orifice, and means to sever the glass at a point beneath the orifice.

Signed at Toledo, in the county of Lucas and State of Ohio, this 11th day of December, 1920.

JOHN F. RULE.